Sept. 6, 1960

E. W. BECKER 2,951,554

PROCESS FOR SEPARATION OF VAPOR PHASE
MIXTURES, ESPECIALLY OF ISOTOPES

Filed Sept. 3, 1957

INVENTOR
ERWIN WILLY BECKER

BY
ATTORNEYS

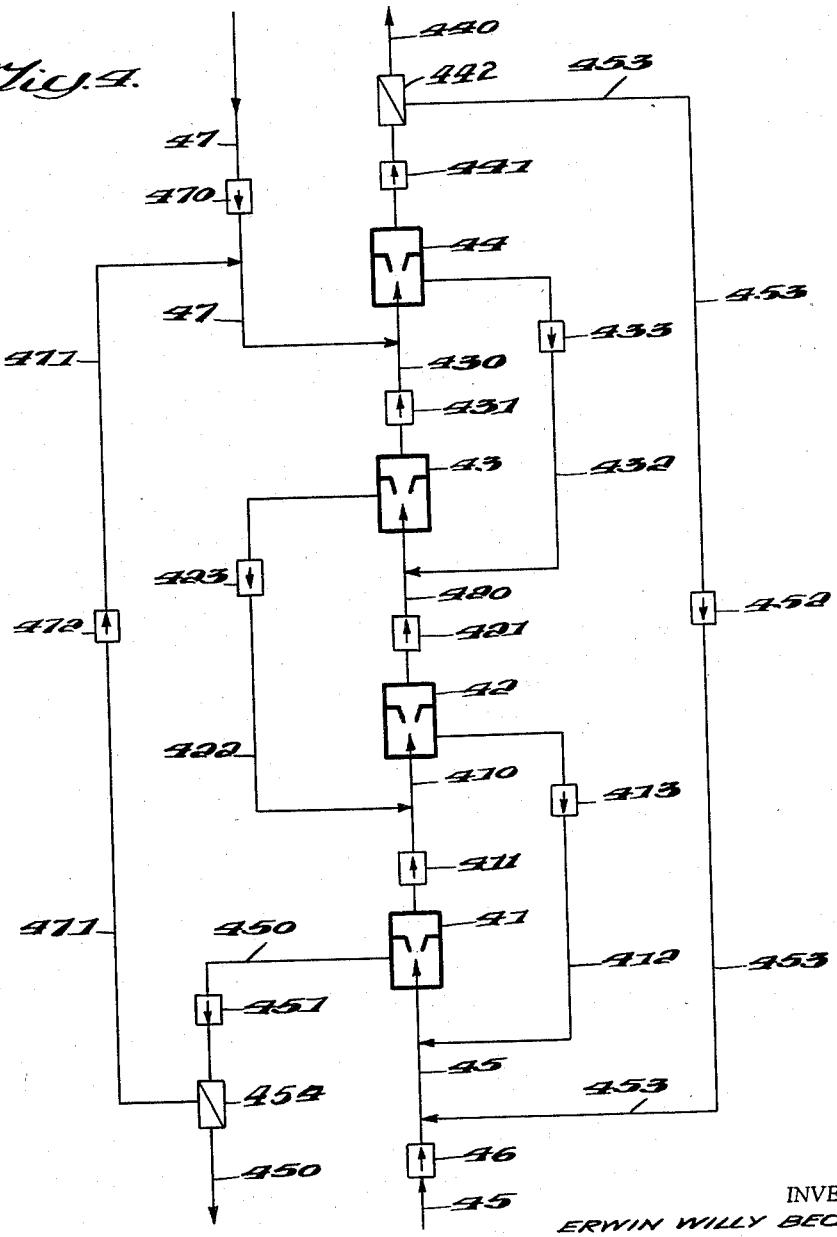

sion of the gas streams can be carried out with types of pumps which deliver a relatively low compression ratio and whose installation and operation therefore is particularly convenient.

United States Patent Office 2,951,554
Patented Sept. 6, 1960

2,951,554

PROCESS FOR SEPARATION OF VAPOR PHASE MIXTURES, ESPECIALLY OF ISOTOPES

Erwin Willy Becker, Marburg, Germany (Strahlerstrasse 18, Karlsruhe-Durlach, Germany)

Filed Sept. 3, 1957, Ser. No. 681,653

Claims priority, application Germany Sept. 5, 1956

7 Claims. (Cl. 183—115)

The present invention relates to improvements in a process for the separation of gaseous phase mixtures, especially those of isotopes, and more particularly to improvements in the separation process disclosed in copending application S.N. 563,387, filed February 3, 1956, now abandoned.

In the process described in such application, mixtures of gaseous or vaporized substances of different molecular weight and/or different effective kinetic cross-section are separated by causing the vapor phase mixtures to be separated to issue from a nozzle-like opening in an expanding jet and the latter is separated by an apertured disphragm arranged across the path of its flow into a core portion which passes through the aperture which is enriched in the heavier component or components and a peripheral portion enriched in the lighter component or components.

According to the invention, it was unexpectedly found that when an inert light gas, such as, hydrogen or helium, preferably in molar excess, is admixed with the vapor phase mixture to be separated it is possible to reduce the ratio of the pressures in the space before the nozzle-like opening to the pressure in the space behind the apertured diaphragm, as well as the ratio of the pressure in the space before the nozzle-like opening to the space between such opening and the apertured diaphragm, to less than ½ and even ⅓ of the ratios normally employed in the process described in application S.N. 563,387 without substantial reduction and even in some instances an increase in the separation factors attained. It is also possible, corresponding to an advantageous embodiment of the process of application S.N. 563,387, to maintain a ratio of the pressure in the space before the nozzle-like opening to the pressure in the space behind the apertured diaphragm much smaller than the ratio of the pressure in the space before the nozzle-like opening to the space between such opening and said apertured diaphragm, not only without decreasing the separation factor but in some instances increasing such separation factor.

The damming effect on the core portion of the vapors can be assisted by suitable measures, such as, for example, special shaping of the apertured diaphragm, as has also been described in application S.N. 563,387, so that the substantial reduction in expansion ratio between the spaces before the nozzle-like opening and after the apertured diaphragm effects considerable savings in compression energy and suction volumes. In carrying out the process according to the invention it is possible to work, for example, in such a way that the ratio of the pressure in the space before the nozzle-like opening to the pressure in the space behind the apertured diaphragm is below 10, preferably below 5, while the ratio of the pressure in the space before the nozzle-like opening to the space between such opening and the apertured diaphragm can be held below 30, preferably below 10. Even though the process according to the invention also involves compression of the additional gas, it does provide economic and technical advantages as the compression of the gas streams can be carried out with types of pumps which deliver a relatively low compression ratio and whose installation and operation therefore is particularly convenient.

In addition, certain technical problems are relatively easily and simply solved when an inert additional relatively light gas is admixed with the mixtures to be separated. For example, the entire separation apparatus can be held under a protective jacket of such inert gas so that slight leakages in the apparatus do not deleteriously effect the separation of air sensitive vapors. It is also possible to save the parts of the apparatus which are most subject to corrosion, such as, the pump bearings, shaft bearings or passages and the like, with the inert additional gas and thereby prevent many repairs and interruptions in operation. In addition, it is possible in this way to simplify the rather difficult sealing problems considerably.

The accompanying drawings show several embodiments of apparatus suitable for use with the process according to the invention.

Fig. 4 diagrammatically shows an apparatus suitable for carrying out the process according to the invention containing a series of separating elements composed of nozzles and apertured diaphragms.

According to an advantageous embodiment of the process according to the invention, it was found that the spatial separation of the components of the mixture to be separated can be further improved by employing special nozzle shapes. Three examples of such shaped nozzles are shown in Figs. 1–3.

Figure 1:
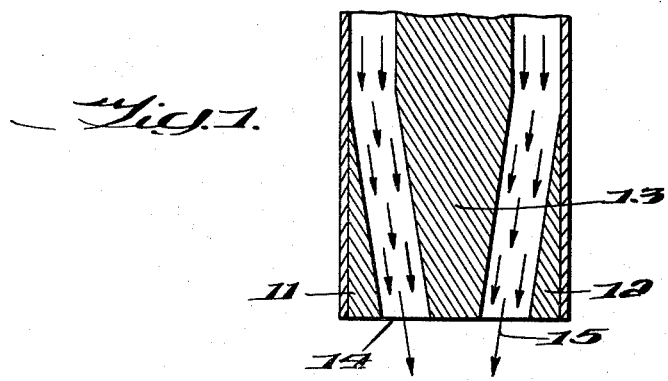
Fig. 1 is a longitudinal section through a slit nozzle.

The nozzle in Fig. 1 contains inserts 11, 12 and 13 which change the form of the opening in such a way that at least two converging gas streams (14 and 15) are formed. Similarly, when a round nozzle is employed, it can be provided with corresponding inserts 21 and 22, as shown in Fig. 2, to provide a ring nozzle in which the portions of the annular stream meet at a certain distance from the nozzle opening and thereby mutually focus each other. As shown in Fig. 3, in some instances it can be expedient under certain circumstances to provide a further gas stream which is passed through the center opening 35 in the modified slit nozzle. The inserts in this modified slit nozzle are designated by 31, 32, 33 and 34.

Figure 2:
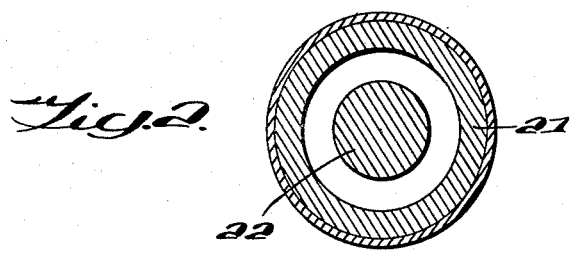
Fig. 2 is a transverse section through a ring nozzle.
Figure 3:
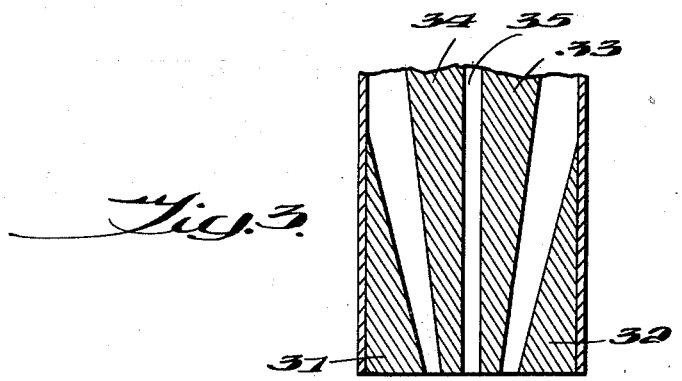
Fig. 3 is a longitudinal section through a modified form of slit nozzle.

Nozzles such as shown in Figs. 1–3 and similar nozzles, for example, concentric ring nozzles with two openings, can, if desired, be operated so that the gas mixture to be separated and the assistant gas are supplied separately to the spaces therein so that such gas streams only meet and mix after leaving the nozzle openings. It is, of course, understood that separate nozzles of corresponding spatial arrangement which operate upon the same principle can be employed instead of the single nozzle structures shown.

In order to increase the separation effect, the separation can be repeated as often as desired, as described in application S.N. 563,387, in a plurality of serially connected separation steps or elements composed of nozzle and apertured diaphragm in which the separated core portions and peripheral portions are again subjected to a separation according to the basic principle of the invention. In such series connection of the separation steps, it is advantageous that the portions of the streams are united in such a manner that at the point of their union they have almost the same composition with reference to the heavy mixture to be separated. An apparatus for such a series type separation is diagrammatically illustrated in Fig. 4 in which 41, 42, 43 and 44 represent four serially connected separation elements, each composed of a nozzle and apertured diaphragm. The gas mixture to be separated is supplied to the first separation element 41 from line 45 with the aid of pump 46 and separated in such element into a core portion and a peripheral portion. The core portion is supplied to the second separation element 42 over conduit 410 and pump 411 and separated again therein into a core portion and peripheral portion. The core portion of the second separation element reaches third separation element 43 over line 420 and pump 421 and the core portion of the third separation element is then similarly supplied over conduit 430 and pump 431 to the fourth separation element 44. The core portion of the fourth separation element which is enriched in the heavy component of the mixture to be separated is withdrawn at 440 with the aid of pump 441 or can be supplied to further separation elements (not shown) as desired. The peripheral portions from each individual separation element, in the example selected, are each united with the gas stream supplied to the respective preceding separation element, as indicated for separation element 41 over conduit 412 and pump 413, for separation element 42 over conduit 422 and pump 423 and for separation element 43 over conduit 432 and pump 433. The peripheral portion from separation element 41 which is impoverished in the heavy component of the heavy mixture is withdrawn over conduit 450 and pump 451 and used for other purposes or, if element 41 is connected to preceding separation elements (not shown), it is united with the gas stream supplied to the next preceding element. In the same manner, when further separation elements are connected to element 44, the peripheral portion from the next element is returned to the gas stream supplied to element 44 over conduit 47 and pump 470.

In some instance it can also be of advantage to take out the light assistant gas from the gas mixture with the aid of coolers, condensers, or other suitable apparatus. In any event, this is recommended when the heavy component withdrawn through conduit 440 is not to be subjected to further similar separations or is to be worked up in another manner. This removal of the light assistant gas can be effected with condenser 442 and the recovered light assistant gas can be recycled over conduit 453 and pump 452 to conduit 45 and be mixed with the heavy gas mixture flowing therethrough. The same measure is also recommended for the peripheral gas portion withdrawn from separation element 41 through conduit 450. The light assistant gas recovered in condenser 454 is supplied to the gas stream flowing in conduit 47 over conduit 471 and pump 472.

In controlling the operation of the described four step separation cascade it is expedient to take care that the ratios of the molar streams of light assistant gas and the heavier gas mixture to be separated is maintained constant at the corresponding spots in the individual separation elements. In most instances this can be achieved by suitable selection of the separation ratio of the total gas mixture $$\vartheta_M = \frac{\text{mol stream of the total gas mixture in peripheral portion}}{\text{mol stream of the total gas mixture in the nozzle}}$$

In some instances it may, however, be necessary to use condensers or the like, as described above, to assist and correct the ratios.

In the following, the function of the closed system for a special example is described in detail with reference to the gas streams which are given in mol per unit of time for all important locations of the apparatus shown in Fig. 4. The mean separation factor between the light assistant gas e.g. He and the heavier gas mixture to be separated e.g. $U^{235}F_6/U^{238}F_6$ $$A_M = n_H(1-n_V)/n_V(1-n_H)$$

is assumed therein to be 9 ($A=9$). In the formula, $n_H$ is the mol fraction of the heavier gas mixture behind the apertured diaphragm and $n_V$ is the mol fraction of the heavier gas mixture in front of the apertured diaphragm when in the direction of the stream. The separation ratio of the heavier gas mixture.

$$\vartheta = \frac{\text{mol stream of the heavier gas mixture in peripheral portion}}{\text{mol stream of the heavier gas mixture in the nozzle}}$$

is assumed to be 0.5, i.e., $\vartheta=0.5$, so that upon recycling of the peripheral gas portion into the nozzle of the preceding separation element the gas streams of the heavier mixture which are united have the same composition. It is possible also according to the directions given in application S.N. 563,387 to operate with other $\vartheta$ values with reference to the heavier gas mixture and corresponding recycling connections. Nevertheless, it is of primary importance to take care that the gas streams which are united have the same composition with reference to the heavier gas mixture (not with reference to the lighter assistant gas).

*Example 1*

0.5 mol (per unit of time) of heavy gas mixture (G) to be separated were introduced into the cascade separation apparatus through conduit 45. 0.1 mol of light assistant gas (Z) was supplied to the heavy gas mixture from condenser 442 over conduit 453 and pump 452, as well as 0.9 mol Z+0.5 mol G from separation element 42 via pump 413 and conduit 412. The resulting mixture (1 mol Z+1 mol G) was supplied to separation element 41 in which it was separated into a peripheral portion of the composition 0.9 mol Z+0.5 mol of G impoverished in the heavier component thereof and a core portion of the composition 0.1 Z+0.5 G enriched in the heavier component thereof. The 0.9 mol Z of the peripheral portion were removed thereafter in condenser 454 and the 0.5 mol G recovered therefrom were supplied to any desired method of working up. The core portion leaving separation vessel 41 is compressed in pump 411 and mixed with the peripheral portion (0.9 Z+0.5 G) from separation element 43 which is supplied over conduit 422 and pump 423 so that the gas mixture supplied to the nozzle of separating element 42 again has the composition 1 mol Z+1 mol G. The same molar ratios are also true for separation elements 43 and 44. However, it is to be noted that 0.5 mol G derived from a further separation step (not shown) supplied over conduit 47 and pump 470 and 0.9 mol Z obtained from condenser 454 derived from the peripheral portion of the gas stream from separation element 41 are admixed with the core portion of the gas stream from separation element 43 before it is supplied to the nozzle of separation element 44. The core portion of the gas stream leaving separation element 44 is supplied to condenser 442 mentioned above wherein 0.1 mol Z is removed therefrom for supply to the gas mixture in conduit 45 and the remaining heavy mixture which is enriched in the heavy component thereof is withdrawn from the cascade over conduit 440.

0.9 mol–0.1 mol Z therefore run from the top to the bottom of the whole cascade. The separation of the assistant light gas by means of the condenser can, of course, in larger plants be effected after a greater number of separation elements have been gone through.

*Example 2*

The following example shows the increase in the separation effect obtained by the use of a light assistant gas at a reduction of pressure ratios:

The separation of the natural $CO_2$-isotopes with the atomic weight of 44 and 45 was tested (a) in pure $CO_2$ and (b) in a mixture of 7 vol. percent $CO_2$ and 93 vol. percent $H_2$.

The starting pressure in the space before the nozzle-like opening is stated as $p_{A'}$, the pressure in the space "behind" (i.e. downstream of) the apertured diaphragm as $p_{C'}$ and the pressure in the space between the nozzle like opening and the apertured diaphragm as $p_{B'}$.

The separation of the $CO_2$-isotope is characterized by the separation factor $$A = \frac{N_H(1-N_V)}{N_V(1-N_H)}$$

whereby $N_H$ is the mol fraction of the $CO_2$ component with atomic weight of 45 behind the apertured diaphragm, and $N_V$ is the mol fraction of the same component before the apertured diaphragm. Both tests were made at a starting pressure $p_{A'} = 30$ mm. Hg and a separation ratio in relation to $CO_2$ of $\vartheta = 25\%$. At expansion ratios of $p_{A'}/p_{B'} = 30$ and $p_{A'}/p_{C'} = 10$ an elementary effect of the separation of $A-1 = 0.016$ was found for $CO_2$ admixed with $H_2$. With pure $CO_2$, however, even at expansion ratios of $p_{A'}/p_{C'} = 1000$ an elementary effect of $A-1 = 0.012$ only could be obtained.

I claim:

1. In a process for the separation of vapor phase mixtures in which the vapor phase mixture to be separated is caused to issue from a nozzle in an expanding jet and an apertured diaphragm is interposed in the path of flow of said expanding jet to separate such jet into a peripheral portion and a core portion which passes through the diaphragm aperture and said peripheral and core portions are collected separately, the step which comprises admixing with the vapor phase mixture to be separated a relatively lighter inert additional assistant gas foreign to the vapor phase mixture to be separated, the quantity of inert additional assistant gas admixed being at least 1 mol per mol of vapor phase mixture to be separated.

2. The process according to claim 1 in which the ratio of the pressure in the space before the nozzle to the pressure in the space behind the apertured diaphragm is maintained below 10.

3. The process according to claim 2 in which the ratio of the pressure in the space before the nozzle to the pressure in the space between such nozzle and the apertured diaphragm is maintained below 30.

4. The process according to claim 1 in which the ratio of the pressure in the space before the nozzle to the pressure in the space behind the apertured diaphragm is maintained below 5.

5. The process according to claim 4 in which the ratio of the pressure in the space before the nozzle to the pressure in the space between such nozzle and the apertured diaphragm is maintained below 10.

6. The process according to claim 1 in which at least two converging streams of the vapor phase mixture to be separated admixed with the assistant gas are caused to issue from said nozzle.

7. The process according to claim 1 in which said nozzle is a ring nozzle.

References Cited in the file of this patent

UNITED STATES PATENTS

| | | |
|---|---|---|
| 2,584,785 | Bowman et al. | Feb. 5, 1952 |
| 2,607,439 | Dickens et al. | Aug. 19, 1952 |
| 2,650,670 | Cichelli | Sept. 1, 1953 |